(12) United States Patent
Jordan et al.

(10) Patent No.: US 8,142,520 B2
(45) Date of Patent: Mar. 27, 2012

(54) BLUE ANTHRAQUINONE DYES, PRODUCTION AND USE THEREOF

(75) Inventors: Hartwig Jordan, Bergisch-Gladbach (DE); Andreas Endres, Leverkusen (DE)

(73) Assignee: DyStar Colours Deutschland GmbH (DE)

( * ) Notice: Subject to any disclaimer, the term of this patent is extended or adjusted under 35 U.S.C. 154(b) by 245 days.

(21) Appl. No.: 12/438,393

(22) PCT Filed: Aug. 24, 2007

(86) PCT No.: PCT/EP2007/058808
§ 371 (c)(1), (2), (4) Date: Feb. 23, 2009

(87) PCT Pub. No.: WO2008/025733
PCT Pub. Date: Mar. 6, 2008

(65) Prior Publication Data
US 2010/0064452 A1 Mar. 18, 2010

(30) Foreign Application Priority Data
Aug. 31, 2006 (DE) .......................... 10 2006 040 801

(51) Int. Cl.
C09B 67/00 (2006.01)
C09B 1/00 (2006.01)

(52) U.S. Cl. ............. 8/643; 8/602; 8/638; 8/675; 8/679; 534/643; 552/224; 552/232

(58) Field of Classification Search .............. 8/636–696, 8/115.51–130, 602; 534/643; 552/224, 232
See application file for complete search history.

(56) References Cited

U.S. PATENT DOCUMENTS

| | | | |
|---|---|---|---|
| 3,507,606 A | 4/1970 | Hildreth et al. | |
| 3,928,396 A | 12/1975 | Kishi et al. | |
| 4,626,257 A * | 12/1986 | Matsuo et al. | 8/638 |
| 5,292,872 A * | 3/1994 | Buhler | 534/854 |
| 2003/0193554 A1* | 10/2003 | Bullock et al. | 347/100 |
| 2004/0226112 A1 | 11/2004 | Himeno et al. | |
| 2005/0155163 A1 | 7/2005 | Griffin et al. | |
| 2006/0230550 A1* | 10/2006 | Hees et al. | 8/534 |

FOREIGN PATENT DOCUMENTS

| | | |
|---|---|---|
| DE | 1619646 | 3/1971 |
| DE | 1955071 | 5/1971 |
| DE | 1963357 | 6/1971 |
| DE | 2021521 | 12/1971 |
| DE | 2318783 | 10/1973 |
| DE | 3035277 A1 | 4/1981 |
| DE | 3208326 A1 | 9/1982 |
| EP | 0735110 A1 | 10/1996 |
| GB | 1270914 | 4/1972 |
| GB | 1278179 | 6/1972 |
| JP | 48-103875 A | 12/1973 |
| JP | 49-001631 | 1/1974 |
| JP | 51-27673 | 3/1976 |
| WO | WO2005017047 A1 * | 2/2005 |
| WO | WO-2005/071016 | 8/2005 |

* cited by examiner

Primary Examiner — Lorna M Douyon
Assistant Examiner — Tri V Nguyen
(74) Attorney, Agent, or Firm — Connolly Bove Lodge & Hutz LLP

(57) ABSTRACT

The present invention concerns dyes of the general formula I

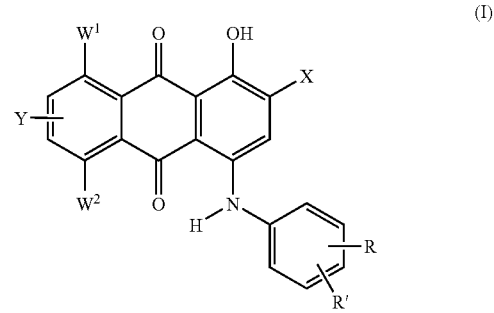

where
X and Y represent hydrogen, bromine or chlorine, but not simultaneously hydrogen;
R represents F, Cl, Br, $COOR^1$ or $CF_3$;
R' represents H or F;
$R^1$ represents $C_1$-$C_6$-alkyl; and
one of $W^1$ and $W^2$ represents hydroxyl and the other nitro and Y is always ortho to the hydroxyl group;
but not compounds in which R represents Cl attached to the phenyl nucleus in a is position ortho to the NH group nor compounds in which $W^1$ represents nitro, $W^2$ represents hydroxyl, Y represents hydrogen, X represents chlorine and R represents bromine attached to the phenyl nucleus in a position meta to the NH group, mixtures with further dyes, and also their preparation and use.

14 Claims, No Drawings

BLUE ANTHRAQUINONE DYES, PRODUCTION AND USE THEREOF

Polyester fibers for use in automotive fabrics are generally dyed blue using anthraquinone dyes, of which a large number have been described.

Halogenated anthraquinone dyes are already known for example from DE 1955071, DE 1963357, DE 2021521, DE 2318783 and DE 3035277.

Compounds with chlorine and bromine substituents in the anthraquinone nucleus are to also described in JP 40-22953. However, the examples recited therein are deficient with regard to colorfastness to light at high temperatures and in some instances also with regard to buildup capacity.

JP 48-103875 and JP 47-38928 describe mixtures of nitro-substituted dyes of this type with amino-substituted dyes of this type bearing a polyhalogenated phenylamino ring. The good buildup capacity of these mixtures on synthetic fibers is emphasized, but colorfastness to light at high temperatures is not sufficient.

JP 51-27673 discloses dyes of the above-described type wherein the phenylamino ring contains a para-disposed hydroxyethyl group. However, these dyes are likewise in need of improvement with regard to colorfastness to light at high temperatures and affinity.

Dyes for dyeing or printing automotive fabrics have to meet high requirements with regard to lightfastness, in particular with regard to colorfastness to light at high temperature, in particular when they constitute part of trichromats, i.e., combinations of blue, yellow and red disperse dyes. Here it is important that the individual components of the trichromat fade at the same rate in order that there are no hue changes under the action of light. There is a need for improved blue dyes in this regard as well.

It is an object of the present invention to provide blue disperse dyes which do not have the above-described disadvantages and which are in particular superior to existing dyes with regard to colorfastness to light at high temperatures, especially in combination with yellow and red dyes in a trichromat.

We have found that this object is achieved, surprisingly, by the dyes defined hereinbelow.

The present invention accordingly provides dyes of the general formula I

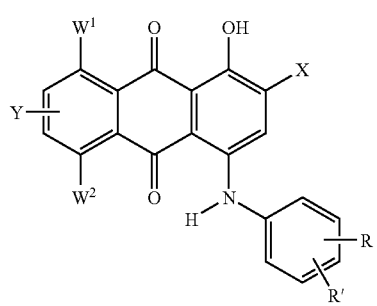

where

X and Y represent hydrogen, bromine or chlorine, but not simultaneously hydrogen;

R represents F, Cl, Br, $COOR^1$ or $CF_3$;

R' represents H or F;

$R^1$ represents $C_1$-$C_6$-alkyl; and one of $W^1$ and $W^2$ represents hydroxyl and the other nitro and Y is always ortho to the hydroxyl group;

but not compounds in which R represents Cl attached to the phenyl nucleus in a position ortho to the NH group nor compounds in which $W^1$ represents nitro, $W^2$ represents hydroxyl, Y represents hydrogen, X represents chlorine and R represents bromine attached to the phenyl nucleus in a position meta to the NH group.

$C_1$-$C_6$-Alkyl $R^1$ may be straight-chain or branched, and denotes for example methyl, ethyl, n-propyl, i-propyl, n-butyl, i-butyl, sec-butyl, tert-butyl, n-pentyl and n-hexyl. Preferably, however, $R^1$ represents methyl or ethyl.

When R' represents F, R preferably likewise represents F.

Preferred compounds of the general formula (I) have the general formulae (I')

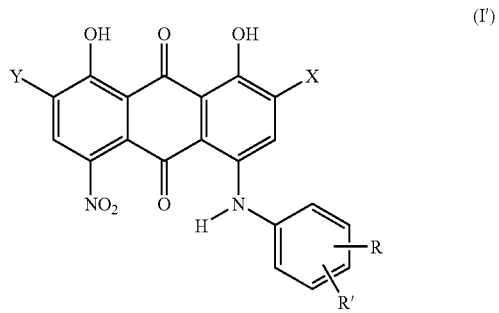

or (I")

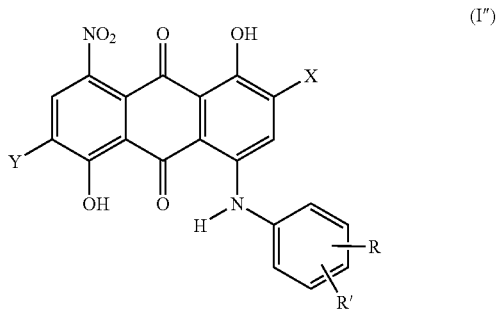

where X, Y, R and R' are each as defined above.

The present invention's dyes of the general formula I may be utilized together with one or more dyes of the kind typically used for dyeing polyesters fibers or polyester textile materials for automotive fabrics.

The present invention accordingly also provides dye mixtures comprising at least one dye of the general formula I and at least one further dye useful for dyeing polyester textile materials for automotive fabrics.

Dyes useful for dyeing polyester textile materials for automotive fabrics are in particular azo, disazo, anthraquinone, nitro and naphthalimide dyes, which will be well known to those skilled in the art.

Preferred yellow and orange dyes of this kind are for example the Colour Index listings C.I. Disperse Yellow 23, 42, 51, 59, 65, 71, 86, 108, 122, 163, 182 and 211, C.I. Solvent Yellow 163, C.I. Disperse Orange 29, 30, 32, 41, 44, 45, 61 and 73, C.I. Pigment Orange 70, C.I. Solvent Brown 53, and also dyes of the formula II

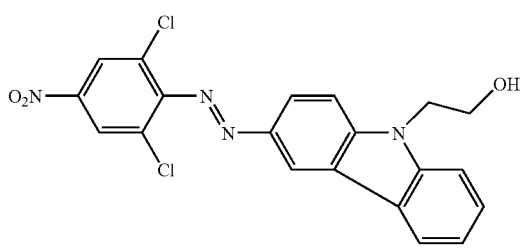
(II)

and dyes of the general formula (III)

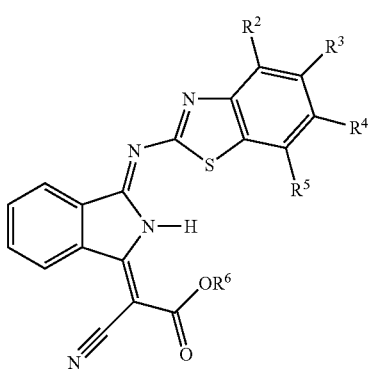
(III)

where

R² to R⁵ are independently hydrogen, chlorine, methyl, ethyl, isopropyl, tert-butyl, cyclohexyl, methoxy, ethoxy, n-propoxy, n-butoxy, methoxyethyl, ethoxyethyl, butoxyethyl or phenoxy; and R⁶ represents methyl, ethyl, propyl, isopropyl, allyl, n-butyl, isobutyl, n-pentyl and isopentyl, hexyl, octyl, 2-ethylhexyl, methoxyethyl, ethoxyethyl, butoxyethyl or butoxyethoxyethyl.

Preferred red dyes of this kind are for example the Colour Index listings C.I. Disperse Red 60, 82, 86, 91, 92, 127, 134, 138, 159, 167, 191, 202, 258, 279, 284, 302 and 323, C.I. Solvent Red 176, and also dyes of the general formulae IV, V and VI

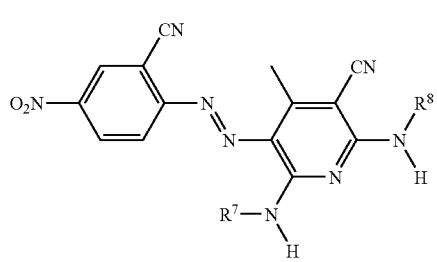
(IV)

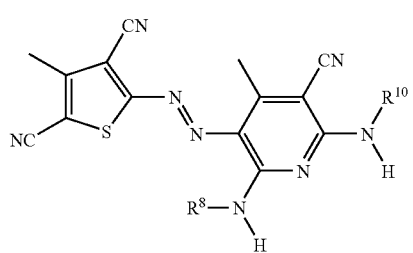
(V)

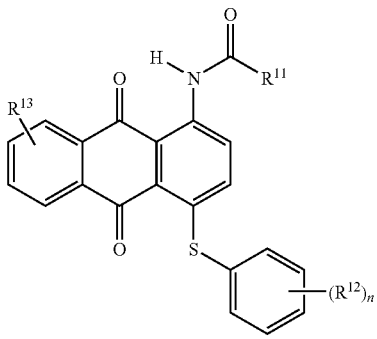
(VI)

where

R⁷ and R⁸ are independently hydroxyethoxyethyl or phenyl;
R⁹ and R¹⁰ are independently hydrogen, hydroxyethoxyethyl, hydroxybutoxypropyl, acetoxyethoxyethyl or acetoxybutoxypropyl;
R¹¹ represents $(C_1-C_8)$-alkyl, phenyl or phenyl substituted by $(C_1-C_4)$-alkyl, hydroxyl or halogen;
R¹² and R¹³ independently represent hydrogen or halogen; and
n represents 0, 1 or 2.

Preferred blue and violet dyes of this kind are for example the Colour Index listings C.I. Disperse Blue 27, 54, 56, 60, 73, 77, 79, 79:1, 87, 266, 333 and 361, C.I. Disperse Violet 27, 28, 57 and 95 and also the dyes of the formula VII

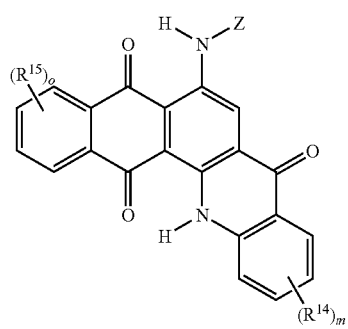
(VII)

where

R¹⁴ and R¹⁵ independently represent $(C_1-C_8)$-alkyl, halogen or hydroxyl;
Z represents —CO(CH₂)₃Cl, optionally $(C_1-C_8)$-alkyl-, halogen- or hydroxyl-substituted —COphenyl or —SO₂R¹⁶;
R¹⁶ represents $(C_1-C_8)$-alkyl, phenyl or phenyl substituted by $(C_1-C_4)$-alkyl, hydroxyl or halogen; and
m and o independently represent 0, 1 or 2.

Preferred dye mixtures of the present invention contain at least one dye of the general formula (I) and at least one yellow or orange or red or blue dye.

Further preferred dye mixtures of the present invention contain at least one dye of the general formula (I) and at least one yellow or orange dye and at least one red dye.

Further preferred dye mixtures of the present invention contain at least one dye of the general formula (I) and at least one further blue dye and also at least one yellow or orange dye and/or at least one red dye.

In the dye mixtures of the present invention, the fractions of dye or dyes of the general formula I and of further dye or dyes useful for dyeing polyester textile materials for automotive fabrics depend solely on the hue to be achieved, and thus may vary within wide limits. In general, the amounts of dye or dyes of the general formula I range from 1% to 99% by weight and the amounts of dye or dyes useful for dyeing polyester textile materials for automotive fabrics from 99% to 1% by weight.

The present invention's dyes of the general formula (I) are obtainable by reacting a compound of the general formula (VIII)

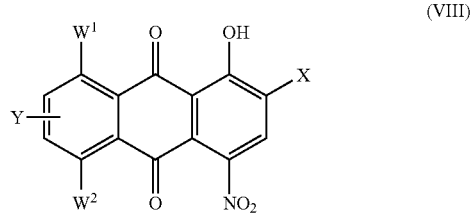

(VIII)

where X, Y, $W^1$ and $W^2$ are each as defined above, with a compound of the general formula (IX)

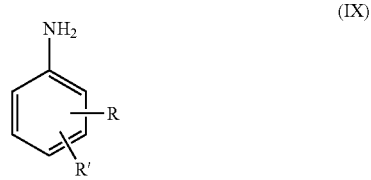

(IX)

where R and R' are each as defined above.

This reaction is preferably carried out in organic solvents, for example methylglycol or nitrobenzene at elevated temperatures, preferably at 120-200° C.

Compounds of the general formula (VIII) in which X and/or Y represent bromine are obtainable by reaction of a compound of the general formula (X)

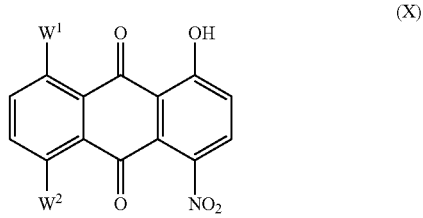

(X)

where $W^1$ and $W^2$ are each as defined above, with a brominating agent.

Useful brominating agents include for example elemental bromine or sodium bromide and hydrogen peroxide.

Useful solvents for these reactions include for example aqueous sodium hydroxide solution, sulfuric acid, pyridine or water which contains emulsifiers. Depending on the amount of brominating agent used, fully brominated compounds of the general formula (VIII), i.e., X=Y=bromine, or their mixtures with monobrominated compounds of the general formula (VIII), i.e., X=bromine and Y=hydrogen or X=hydrogen and Y=bromine, are obtained. Unconverted compounds of the general formula (X) may also still be present, as the case may be.

The degree of bromination can thus vary within wide limits, a degree of bromination equivalent to 0.5 to 1.5 bromine atoms per molecule being particularly preferred. Compounds of the general formula (VIII) in which X and/or Y represent chlorine are obtainable by reaction of the compound of the general formula (X) with a chlorinating agent, in particular elemental chlorine. This reaction, as well as leading to the introduction of one to two chlorine atoms to the molecule, leads to the reduction of a nitro group to a nitroso group. The latter has to be reoxidized back to the nitro group in an additional synthesizing step. Customary oxidizing agents are used, advantageously hydrogen peroxide and catalytic amounts of tris(cetylpyridinium)peroxotungstophosphate, as described in the literature (S. Sakaue, T. Tsubakino, Y. Nishiyama, Y. Ishii, *J. Org. Chem.* 1993, 58, 3633-3638).

The chlorination of the compound of the general formula (X) will give products having different degrees of chlorination, depending on how the reaction is carried out. A degree of chlorination equivalent to 0.5 to 1.5 chlorine atoms per molecule is particularly preferred.

The dye mixtures of the present invention are obtainable by mechanically mixing the individual components in the desired mixing ratios.

The present invention's dyes and dye mixtures are very useful for dyeing and printing hydrophobic synthetic materials, the dyeings and prints obtained having a remarkably high lightfastness and colorfastness to light at high temperatures, so that the textiles thus dyed can be used for automotive interiors.

The present invention thus also provides for the use of the present invention's dyes and dye mixtures for dyeing and printing hydrophobic materials, or to be more precise processes for dyeing or printing such materials in a conventional manner by utilizing one or more dyes of the present invention or a dye mixture of the present invention as a colorant.

Useful hydrophobic synthetic and semi-synthetic materials include for example secondary cellulose acetate, cellulose triacetate, polyamides and, in particular, high molecular weight polyesters. Materials composed of high molecular weight polyesters are in particular those based on polyethylene glycol terephthalates. The hydrophobic synthetic materials can be present in the form of sheet- or threadlike constructions and can have been processed, for example, into yarns or into woven or knitted textile materials. Preference is given to fibrous textile materials, which can also be present in the form of microfibers for example.

The dyes and dye mixtures of the present invention are very particularly useful for dyeing and printing polyester fibers and polyester textile materials for automotive fabrics. It is preferable for the dyeing and printing to be carried out in the presence of UV absorbers, for example UV absorbers based on benzophenone, phenyltriazole or benzotriazole. Details concerning the dyeing and printing of automotive fabrics are known to those skilled in the art and are described in the pertinent literature. In addition, however, the dyes and dye mixtures of the present invention can also be used with advantage for dyeing and printing hydrophobic synthetic materials envisaged for other purposes, examples being alkalized polyester fibers, polyester microfibers or materials that are not in fiber form.

The dyeing in accordance with the use provided by the present invention can be carried out in a conventional manner, preferably from an aqueous dispersion, if appropriate in the presence of carriers, at between 80 to about 110° C. by the exhaust process or by the HT process in a dyeing autoclave at 110 to 140° C., and also by the so-called thermofix process, in which the fabric is padded with the dyeing liquor and subsequently fixed/set at about 180 to 230° C.

Printing of the materials mentioned can be carried out in a manner known per se by incorporating the dye or dye mixtures of the present invention in a print paste and treating the fabric printed therewith at temperatures between 180 to 230° C. with HT steam, high-pressure steam or dry heat, if appropriate in the presence of a carrier, to fix the dye.

The dyes and dye mixtures of the present invention shall be in a very fine state of subdivision when they are used in dyeing liquors, padding liquors or print pastes. The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 µm and preferably equal to about 1 µm. The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained should be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not allowed to be below 15 percent by weight.

The dispersions may also contain still further auxiliaries, for example those which act as an oxidizing agent, for example sodium m-nitrobenzenesulfonate, or fungicidal agents, for example sodium o-phenylphenoxide and sodium pentachlorophenoxide, and particularly so-called "acid donors", examples being butyrolactone, monochloro-acetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides liquid inks for digital textile printing by the ink jet process, the inks comprising a dye of the present invention or a dye mixture of the present invention.

The liquid inks of the present invention are preferably aqueous and comprise the present invention's dyes or dye mixture, for example in amounts of 0.1% to 50% by weight, preferably in amounts of 1% to 30% by weight and more preferably in amounts of 1% to 15% by weight based on the total weight of the ink.

They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The liquid inks of the present invention may further comprise customary additives, for example viscosity moderators to set viscosities in the range from 1.5 to 40.0 mPas in the temperature range of 20 to 50° C. Preferred liquid inks have a viscosity in the range from 1.5 to 20 mPas and particularly preferred liquid inks have a viscosity in the range from 1.5 to 15 mPas.

Useful viscosity moderators include rheological additives, for example polyvinylcaprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the liquid inks of the present invention may include surface-active substances to set surface tensions in the range from 20 to 65 mN/m, which are if appropriate adapted depending on the process used (thermal or piezo technology).

Useful surface-active substances include for example surfactants of any kind, preferably nonionic surfactants, butyldiglycol and 1,2 hexanediol.

The liquid inks may further include customary additives, for example inhibitors of fungal and bacterial growth in amounts from 0.01% to 1% by weight based on the total weight of the liquid ink.

The liquid inks of the present invention can be prepared in conventional manner by mixing the components in water.

The examples which follow illustrate the invention.

EXAMPLE 1 a) 46.4 parts of dinitrochrysazine (1,8-dihydroxy-4,5-dinitroanthraquinone) are suspended in 137 parts of anhydrous pyridine and cooled down to −5° C. At this temperature, a solution of 22.6 parts of bromine in 48.1 parts of pyridine (anhydrous) is added dropwise. A further 68 parts of pyridine (anhydrous) are added to improve stirrability. The reaction mixture is subsequently stirred at −5° C. for 2.5 h and then poured into 1760 parts of water. The mixture is acidified with hydrochloric acid, subsequently stirred for 1 h and filtered. The suction filter cake is washed neutral with water and dried at 40° C. under reduced pressure.

Yield: 55.5 parts of a mixture of compounds (Xa), (VIIIa) and (VIIIb)

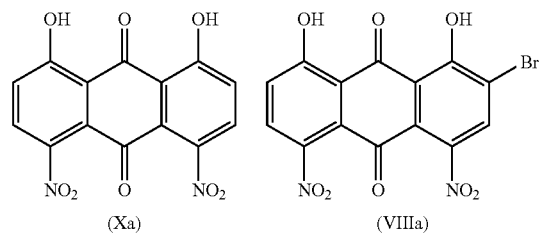

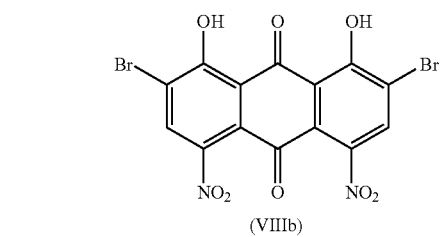

Composition by HPLC:

20% compound of formula (Xa)
51% compound of formula (VIIIa)
29% compound of formula (VIIIb)

b) 4.1 parts of the mixture obtained according to a) are presented as initial charge in 54 parts of nitrobenzene and mixed with 5.21 parts of p-chloroaniline. After stirring at 150° C. for 7.5 h the mixture is allowed to cool down to room temperature, poured into 158 parts of methanol, and the resulting mixture is stirred for 30 min before filtering off with suction, washing with methanol and drying at 40° C. under reduced pressure.

Yield: 3.75 parts of a blue dye ($\lambda_{max}$=629 nm (DMF)) containing the present invention's compounds (Ia), (Ib) and (Ic) and also the compound (XIa) formed from the compound of formula (Xa).

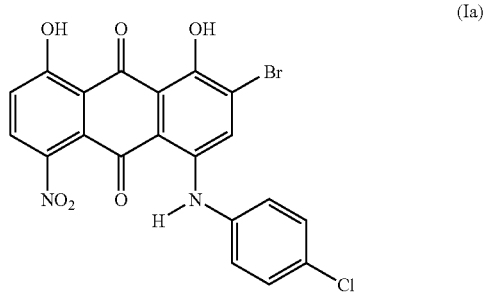

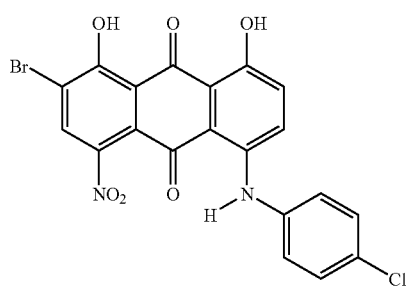

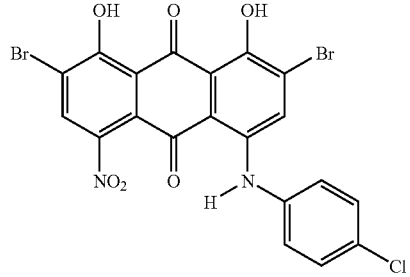

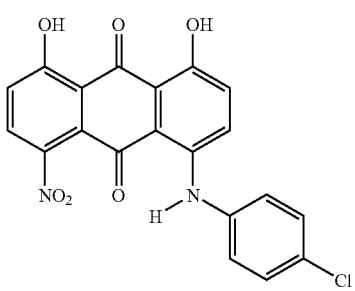

EXAMPLES 2 TO 9 a) 33 parts of dinitrochrysazine are suspended in 900 parts of 0.89% aqueous sodium hyroxide solution. 32 parts of bromine are added dropwise at room temperature. This is followed by heating to 40-50° C. and stirring at 40-50° C. for 2 h.

Thereafter, a further 9.6 parts of bromine are added dropwise before subsequent stirring at 40-50° C. for 2 h. This is followed by cooling to room temperature, filtration and washing neutral with water. Drying leaves 46.3 parts of the compound of the formula (VIIIb) (94.9% of theory).

b) Reacting the compound of the formula (VIIIb), obtained according to a), with variously substituted anilines as indicated in example 1b) gives the following inventive compounds:

| Example | $W^1$ | $W^2$ | X | Y | R | $\lambda_{max}$ in DMF [nm] |
|---|---|---|---|---|---|---|
| 2 | OH | $NO_2$ | Br | Br | m-Cl | 628 |
| 3 | OH | $NO_2$ | Br | Br | m-Br | 629 |
| 4 | OH | $NO_2$ | Br | Br | m-COOMe | 630 |
| 4a | OH | $NO_2$ | Br | Br | p-F | 630 |

The following compounds are obtainable in a similar manner:

| Example | W¹ | W² | X | Y | R | $\lambda_{max}$ in DMF [nm] |
|---|---|---|---|---|---|---|
| 5 | NO₂ | OH | Br | Br | m-Cl | 646 |
| 6 | NO₂ | OH | Br | Br | m-Br | 635 |
| 7 | NO₂ | OH | Br | Br | p-Cl | 636 |
| 8 | NO₂ | OH | Br | Br | p-Br | 636 |
| 9 | NO₂ | OH | Br | Br | o-Br | 609 |

EXAMPLES 10 TO 12 a) 78.4 parts of dinitroanthrarufine (1,5-dihydroxy-4,8-dinitroanthraquinone) are introduced into a mixture of 1153 parts of sulfuric acid monohydrate and 152 parts of oleum. 1.4 parts of iodine are added. Chlorine is passed into the mixture for about 3 h, to the point of saturation, the temperature rising to 28-30° C. After pouring onto 4400 parts of ice-water, the mixture is stirred for 30 minutes and filtered off with suction. The filter residue is washed neutral with water and dried under reduced pressure to leave 77.9 parts of crude product comprising the compounds of the formulae (VIIIc), (XII), (XIII) and (XIV):

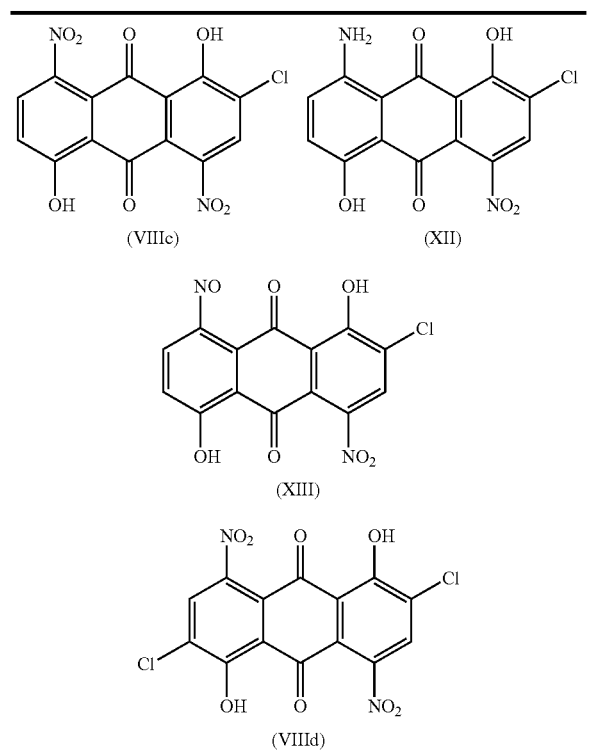

Composition:
5% compound of formula (VIIIc)
15% compound of formula (XII)
55% compound of formula (XIII)
25% compound of formula (VIIId)

The chlorine atom in the compounds (XII) and (XIII) can also be attached ortho to the other hydroxyl group.

Purification is possible by stirring in 630 parts of ethanol under reflux for 3 h, filtering off hot with suction and washing with ethanol. Drying leaves 64.2 parts of product, which corresponds to 77.6% of theory. The compound of the formula (XII) has become depleted in the process.

b) 22.5 parts of the mixture obtained according to a) are refluxed in 124 parts of tert-butanol and 146 parts of 35% hydrogen peroxide for 2 h. Then, 9 parts of tris(cetylpyridinium)peroxotungstophosphate [π-C₅H₅N(CH₂)₁₅CH₃]₃—{PO₄[W(O)(O₂)₂]₄} are added. This is followed by a further 2 h of refluxing, cooling down to room temperature and filtering off with suction. The filter residue is washed with a little tert-butanol and then with water. Drying leaves 20.9 parts of a mixture of the following composition:
5% of the formula compound (XII)
65% of the formula compound (VIIIc)
30% of the formula compound (VIIId)

c) Reacting the mixture obtained according to b) with variously substituted anilines as indicated in example 1b) gives the following inventive compounds:

| Example | W¹ | W² | X | Y | R | $\lambda_{max}$ in DMF [nm] |
|---|---|---|---|---|---|---|
| 10 | NO₂ | OH | Cl | H | m-Cl | 626 |
| 11 | NO₂ | OH | Cl | H | p-Br | 632 |
| 12 | NO₂ | OH | Cl | H | m-COOMe | 620 |

X=Cl and Y=H is to be understood as meaning that, on average, about one chlorine atom is attached to the anthraquinone nucleus.

EXAMPLES 13 TO 31

The following compounds are obtainable analogously to the procedures described in the preceding examples:

| Example | W¹ | W² | X | Y | R (+ R') | $\lambda_{max}$ in DMF [nm] |
|---|---|---|---|---|---|---|
| 13 | OH | NO₂ | Cl | H | m-Cl | 624 |
| 14 | OH | NO₂ | Cl | H | m-Br | 626 |
| 15 | OH | NO₂ | Cl | H | m-COOMe | 625 |
| 16 | OH | NO₂ | Br | H | o-COOMe | 629 |
| 17 | OH | NO₂ | Br | H | m-COOEt | 627 |
| 18 | OH | NO₂ | Br | H | p-COOEt | 629 |
| 19 | OH | NO₂ | Br | H | m-COOMe | 628 |
| 20 | OH | NO₂ | Br | H | m-Cl | 621 |
| 21 | OH | NO₂ | Br | H | m-Br | 623 |
| 22 | OH | NO₂ | Br | H | p-Br | 627 |
| 23 | OH | NO₂ | Br | H | o-F | 610 |
| 24 | OH | NO₂ | Br | H | p-F | 612 |
| 25 | OH | NO₂ | Br | H | 3,4-di-F | 624 |
| 26 | OH | NO₂ | Br | H | 2,5-di-F | 616 |
| 27 | OH | NO₂ | Br | H | m-CF₃ | 620 |
| 28 | NO₂ | OH | Br | H | m-Cl | 623 |
| 29 | NO₂ | OH | Br | H | m-Br | 627 |
| 30 | NO₂ | OH | Br | H | p-Br | 630 |
| 31 | NO₂ | OH | Br | H | m-COOMe | 624 |

EXAMPLE 32

30 g of the dye obtained according to example 1 (in the form of the water-moist presscake) are admixed in 200 ml of water with 63 g of sodium ligninsulfonate and 3 g of a nonionic dispersant (addition product of abietic acid and 50 mol equivalents of ethylene oxide) and adjusted to pH 7 with 25% sulfuric acid. This is followed by bead milling at room temperature for 1 h (90%<1 μm), sieving and drying in a spray dryer.

2 g of the powder thus obtained are dispersed in 1000 g of water. The dispersion is admixed with 0.5 to 2 g per l of liquor of a commercially available dispersant based on a condensation product of naphthalenesulfonic acid sodium salt and formaldehyde, 0.5 to 2 g per l of liquor of monosodium phosphate and 2 g per l of liquor of a commercially available leveling assistant and adjusted to a pH in the range from 4.5 to 5.5 with acetic acid. The dyeing liquor thus obtained is entered with 100 g of a textured polyester fabric based on polyethylene glycol terephthalate for 60 min of dyeing at 130° C. Reduction clearing leaves a blue dyeing of excellent lightfastness and colorfastness to light at high temperatures and very good sublimation fastness.

Repeating example 32 with the dyes of examples 2 to 31 likewise gives blue dyeings of excellent colorfastness to light at high temperatures.

EXAMPLE 33

0.093 g of the dye from example 15 are dissolved hot in 10 ml of DMF, followed by the addition of 1 ml of concentrated Levegal® DLP (Levegal is a registered trade mark of Lanxess Deutschland GmbH) and also 290 ml of water. While stirring, 0.2 g of Disperse Yellow 71 (as 33.7% strength finished product) and 0.13 g of Disperse Red 86 (as 34.9% strength finished product) are added. Acetic acid/sodium acetate is used to adjust to pH 4.5 and 1 g of Levegal DLP is added to 1 l of this liquor.

A volume containing 0.00465 g of dye of example 15 is taken from this stock solution, made up to 100 ml with water and entered with 5 g of velour polyester. The fabric is dyed for 45 min at 135° C. with a heating rate of 1 degree/min. Cooling is followed by hot and cold rinsing. Reduction clearing leaves a gray dyeing of excellent colorfastness to light at high temperatures.

Repeating this dyeing in the presence of 0.100 g of a UV absorber based on phenyltriazines or benzotriazoles likewise gives gray dyeings of excellent colorfastness to light at high temperatures, although in the case of phenyltriazine the colorfastness to light at high temperatures is somewhat higher than without use of a UV absorber.

EXAMPLE 34

0.082 g of the dye from example 15 are dissolved hot in 10 ml of DMF, followed by the addition of 1 ml of concentrated Levegal® DLP and also 290 ml of water. While stirring, 0.27 g of Solvent Yellow 163 (as 30.7% strength finished product) and 0.041 g of a dye of the formula (IV) where $R^7$=phenyl and $R^8$=hydroxyethoxyethyl in the form of the isomeric mixture with swapped $R^7$ and $R^8$ (as 23.4% strength finished product) are added. Acetic acid/sodium acetate is used to adjust to pH 4.5 and 1 g of Levegal DLP is added to 1 l of this liquor.

A volume containing 0.0041 g of dye of example 15 is taken from this stock solution, made up to 100 ml with water and entered with 5 g of velour polyester. The fabric is dyed for 45 min at 135° C. with a heating rate of 1 degree/min. Cooling is followed by hot and cold rinsing. Reduction clearing likewise leaves a gray dyeing of excellent colorfastness to light at high temperatures.

Repeating this dyeing in the presence of 0.150 g of a UV absorber based on phenyltriazines or of 0.100 g of a UV absorber based on benzotriazoles likewise gives gray dyeings of excellent colorfastness to light at high temperatures, although in the case of phenyltriazine the colorfastness to light at high temperatures is somewhat higher than without use of a UV absorber.

EXAMPLE 35

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing 3.5% of the dye of the example 1, 2.5% of Disperbyk 190 dispersant, 30% of 1,5-pentanediol, 5% of diethylene glycol monomethyl ether, 0.01% of Mergal K9N biocide and 58.99% of water using a drop-on-demand (piezo) inkjet print head. The print is fully dried. Fixing is effected by means of superheated steam at 175° C. for 7 minutes. The print is subsequently subjected to an alkaline reduction clear, rinsed warm and then dried.

I claim:

1. A dye mixture comprising at least one dye of the formula I

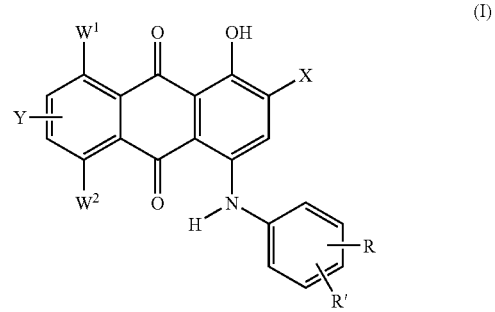

where

X and Y represent hydrogen, bromine or chlorine, but not simultaneously hydrogen;

R represents F, Cl, Br, $COOR^1$ or $CF_3$;

R' represents H or F;

$R^1$ represents $C_1$-$C_6$-alkyl; and one of $W^1$ and $W^2$ represents hydroxyl and the other nitro and Y is always ortho to the hydroxyl group;

but not compounds in which R represents Cl attached to the phenyl nucleus in a position ortho to the NH group nor compounds in which $W^1$ represents nitro, $W^2$ represents hydroxyl, Y represents hydrogen, X represents chlorine and R represents bromine attached to the phenyl nucleus in a position meta to the NH group and at least one further dye useful for dyeing polyester textile materials for automotive fabrics.

2. The dye mixture as claimed in claim 1, comprising as further dye a yellow or orange dye selected from the group consisting of the dyes C.I. Disperse Yellow 23, 42, 51, 59, 65, 71, 86, 108, 122, 163, 182 and 211, C.I. Solvent Yellow 163, C.I. Disperse Orange 29, 30, 32, 41, 44, 45, 61 and 73, C.I. Pigment Orange 70, C.I. Solvent Brown 53, the dye of the formula II

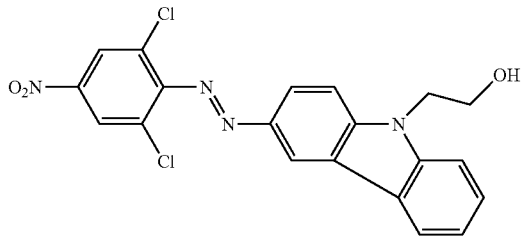

(II)

and the dye of the general formula (III)

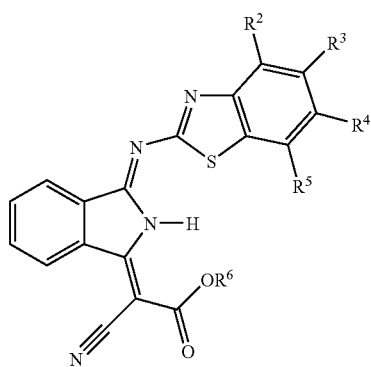

(III)

where $R^2$ to $R^5$ independently represent hydrogen, chlorine, methyl, ethyl, isopropyl, tert-butyl, cyclohexyl, methoxy, ethoxy, n-propoxy, n-butoxy, methoxyethyl, ethoxyethyl, butoxyethyl or phenoxy; and $R^6$ represents methyl, ethyl, propyl, isopropyl, allyl, n-butyl, isobutyl, n-pentyl, isopentyl, hexyl, octyl, 2-ethylhexyl, methoxyethyl, ethoxyethyl, butoxyethyl or butoxyethoxyethyl.

3. The dye mixture as claimed in claim 1, comprising as further dye a red dye selected from the group consisting of the dyes C.I. Disperse Red 60, 82, 86, 91, 92, 127, 134, 138, 159, 167, 191, 202, 258, 279, 284, 302 and 323, C.I. Solvent Red 176 and the dyes of the general formulae IV, V and VI

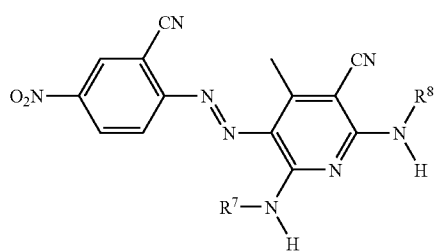

(IV)

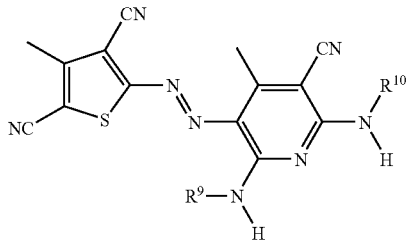

(V)

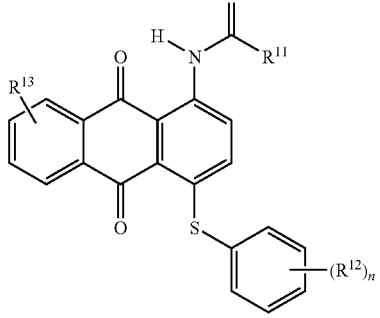

(VI)

where $R^7$ and $R^8$ independently represent hydroxyethoxyethyl or phenyl;

$R^9$ and $R^{10}$ independently represent hydrogen, hydroxyethoxyethyl, hydroxybutoxy-propyl, acetoxyethoxyethyl or acetoxybutoxypropyl;

$R^{11}$ represents $(C_1-C_8)$-alkyl, phenyl or phenyl substituted by $(C_1-C_4)$-alkyl, hydroxy or halogen;

$R^{12}$ and $R^{13}$ independently represent hydrogen or halogen; and n represents 0, 1 or 2.

4. The dye mixture as claimed in claim 1, comprising as further dye a blue or violet dye selected from the group consisting of the dyes C.I. Disperse Blue 27, 54, 56, 60, 73, 77, 79, 79:1, 87, 266, 333 and 361, C.I. Disperse Violet 27, 28, 57 and 95 and the dyes of the formula VII

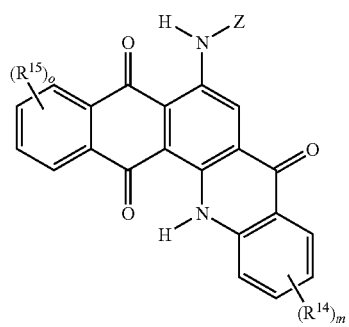

(VII)

where $R^{14}$ and $R^{15}$ independently represent $(C_1-C_8)$-alkyl, halogen or hydroxyl;

Z represents —$CO(CH_2)_3Cl$, optionally $(C_1-C_8)$-alkyl-, halogen- or hydroxyl-substituted —COphenyl or —$SO_2R^{16}$;

$R^{16}$ represents $(C_1-C_8)$-alkyl, phenyl or phenyl substituted by $(C_1-C_4)$-alkyl, hydroxyl or halogen; and m and o independently represents 0, 1 or 2.

5. The dye mixture as claimed in claim 1, wherein R is F.

6. The dye mixture as claimed in claim 1, wherein R is COOR$^1$.

7. The dye mixture as claimed in claim 1, wherein R is CF$_3$.

8. The dye mixture as claimed in claim 1, wherein R is F, COOR$^1$ or CF$_3$.

9. The dye mixture as claimed in claim 1, wherein R is F and R' is H.

10. The dye mixture as claimed in claim 1, wherein R is F and is located in the para position of the phenyl ring and R' is H.

11. A process for dyeing and printing hydrophobic material which comprises contacting the material with the dye mixture as defined in claim 1.

12. The process as claimed in claim 11, wherein polyester fibers and polyester textile materials for automotive fabrics are dyed or printed.

13. The process as claimed in claim 12, wherein dyeing or printing is effected in the presence of UV absorbers.

14. A liquid ink for digital textile printing by the ink jet process comprising the dye mixture of as claimed in claim 1.

* * * * *